United States Patent
Biondo et al.

(10) Patent No.: US 9,764,688 B2
(45) Date of Patent: Sep. 19, 2017

(54) CHILD/INTRUDER DETECTION ALERT THROUGH UTILIZATION OF INTERIOR MOTION/SOUND SENSORS

(71) Applicant: GM Global Technology Operations LLC, Detroit, MI (US)

(72) Inventors: William A. Biondo, Beverly Hills, MI (US); Julie A. Kleinert, Fenton, MI (US); Fred W. Huntzicker, Ann Arbor, MI (US); Tricia E. Morrow, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/963,885

(22) Filed: Dec. 9, 2015

(65) Prior Publication Data

US 2017/0166121 A1 Jun. 15, 2017

(51) Int. Cl.
| | |
|---|---|
| *G08B 21/02* | (2006.01) |
| *B60Q 9/00* | (2006.01) |
| *B60R 11/04* | (2006.01) |
| *B60Q 5/00* | (2006.01) |
| *B60Q 1/00* | (2006.01) |
| *B60R 1/00* | (2006.01) |

(52) U.S. Cl.
CPC ............. *B60Q 9/00* (2013.01); *B60Q 1/00* (2013.01); *B60Q 5/005* (2013.01); *B60R 1/00* (2013.01); *B60R 11/04* (2013.01); *B60R 2300/8013* (2013.01)

(58) Field of Classification Search
CPC ........................................................ B60C 9/00
USPC .................................................. 340/468, 457
See application file for complete search history.

(56) References Cited

U.S. PATENT DOCUMENTS

| | | | |
|---|---|---|---|
| 6,639,512 B1* | 10/2003 | Lee .................. | G08B 21/02 340/425.5 |
| 2004/0155783 A1* | 8/2004 | Al-Sheikh ........... | G08B 21/22 340/584 |
| 2009/0278390 A1* | 11/2009 | Carter ............... | B60N 2/2839 297/217.4 |
| 2012/0268265 A1* | 10/2012 | Morley .............. | B60N 2/002 340/457 |
| 2014/0253313 A1* | 9/2014 | Schoenberg ........ | B60N 2/28 340/457 |
| 2015/0137962 A1* | 5/2015 | Binnicker .......... | B60Q 9/00 340/457 |
| 2016/0042624 A1* | 2/2016 | Quave ............... | G08B 21/02 340/457 |
| 2016/0171859 A1* | 6/2016 | Bowlus ............. | B60N 2/002 340/457 |

* cited by examiner

*Primary Examiner* — Brent Swarthout
(74) *Attorney, Agent, or Firm* — BrooksGroup

(57) ABSTRACT

A number of illustrative variations may include a method of using vehicle sensors to produce an alert.

13 Claims, 1 Drawing Sheet

CHILD/INTRUDER DETECTION ALERT THROUGH UTILIZATION OF INTERIOR MOTION/SOUND SENSORS

TECHNICAL FIELD

The field to which the disclosure generally relates to includes vehicle alert systems.

BACKGROUND

Some vehicles come with sensors which may be used to detect unwanted occurrences or conditions in or around a vehicle.

SUMMARY OF ILLUSTRATIVE VARIATIONS

A number of illustrative variations may include a method of using a controller and combinational or sequential logic and vehicle sensors or cameras to produce a notification.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
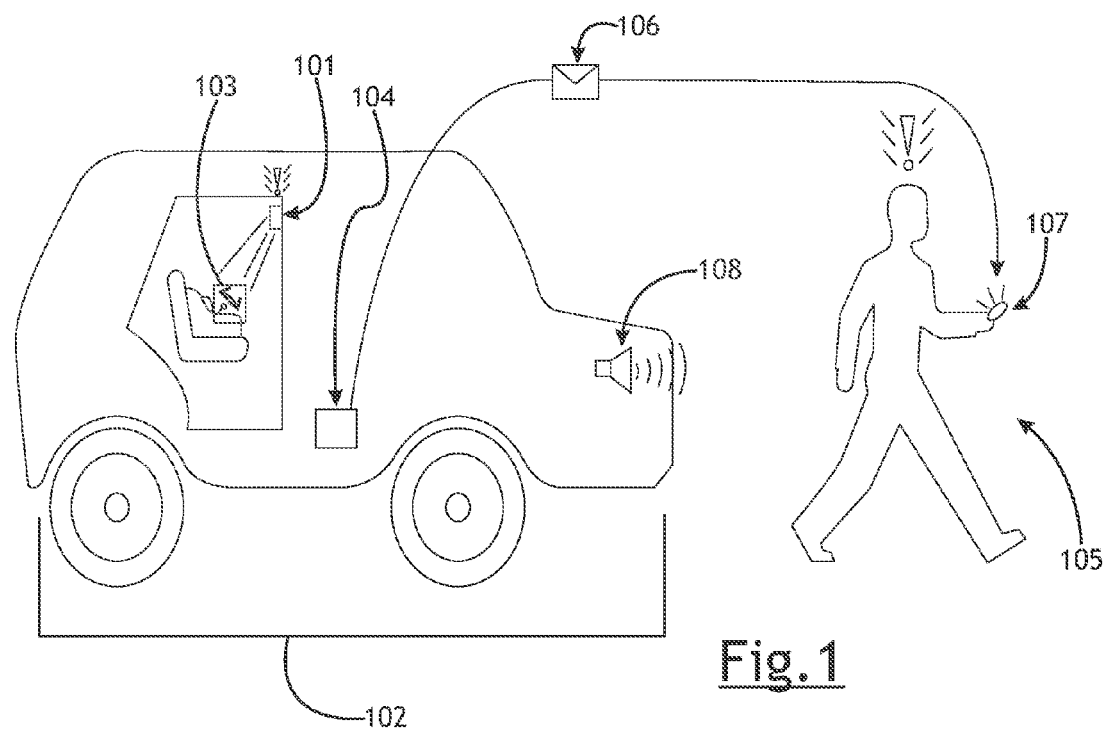
FIG. 1 illustrates a scenario which may cause an alert to be produced according to a number of variations.

The following description of the variations is merely illustrative in nature and is in no way intended to limit the scope of the invention, its application, or uses.

In a number of illustrative variations, a vehicle may comprise a number of components including but not limited to doors, seatbelts, seats, headlights, an engine, an air conditioning system and all of its parts, wheels, a transmission, etc. The vehicle may also include any number of sensors or cameras, interior to or exterior to the cabin of the vehicle, which may sense and be polled or read by a controller. The sensors or cameras may sense and produce signals based upon the at least one of the engagement, orientation, state, condition, or presence of any number of vehicle components or accessories. The sensors or cameras may sense motion, acceleration, depth, light, gas concentrations, atmospheric pressure, pressure waves including but not limited to sound waves, heat, seat occupancy, humidity, belt usage, door usage, lock engagement and any other vehicle component or accessory usage, internal climate state of the vehicle or change or rate-of-change of the internal climate state of the vehicle. The cameras may be used along with software to detect pixel change in a recording, which might indicate things such as motion, depth, light, heat, and anything else which cameras may be used to detect. In addition, the sensors or cameras may detect communication devices such as but not limited to RFID tags, infrared emitters, SONAR beacons, radio beacons, etc. Additionally, at least one of the sensor or camera signals or readings may be tracked and used by a controller in sequential logic as well as combinational logic.

In a number of illustrative variations, a vehicle may be paired with any number of active or passive communication devices such as a transmitter, receiver, or transceiver. In such variations, the communication devices may come in any number of forms or embedded in any number of portable devices such as key FOBs, personal effects, jewelry, clothing, etc. Additionally, the vehicle may use sensors or cameras to detect the presence or absence of the remote communication device, and may also produce an alert based upon the presence or absence of any number or combination of the communication devices. Additionally, such alerts may be produced by the detection of the presence or absence of the communication devices, over time, in any number of sequences of events.

In a number of illustrative variations, a controller, which is capable of processing sequential logic as well as combinational logic, may be housed onboard a vehicle. Additionally, a device capable of reading data from memory and/or external storage devices may be in electrical communication with vehicle components including but not limited to the controller. The controller may have onboard memory and may be in electrical communication with an external data storage device as well as external memory devices. The controller may be in electrical communication with any number of sensors, cameras, controllers, batteries, renewable energy sources or other electrical devices and may have the ability to store and timestamp data indicative of readings and/or signals from any number of sensors or cameras.

In a number of illustrative variations, the vehicle may include hardware which is capable of transmitting sensor or camera data from the vehicle to a receiver wirelessly. For example, in a number of such illustrative variations, hardware onboard the vehicle may transmit an alert message to a user of the alert system. Additionally, in some such illustrative variations, a picture of the interior of the vehicle may be sent to a user of the alert system at one or several phone numbers or email addresses sometime after it is determined by the alert algorithm that an alert should be sent to a user of the alert system.

In a number of illustrative variations, the alert system may send a recording of a sound which triggered the alert system to contact the alert system user. In some such illustrative variations, the alert system may contact the user and offer via a prompt to open a sound channel for real-time sound monitoring via a standalone microphone, or a microphone which is integrated into the vehicle electronics or at least one of the vehicle sensors or cameras.

In a number of illustrative variations, detection of a communication device which is associated with an object or a living organism may trigger the alert system to send an alert, with or without an accompanying interactive prompt, to an alert system user.

In a number of illustrative variations, any number of sensors or cameras may be used to detect that, over a period of time since the car was turned off and an alarm system user has left the vehicle, the level of $Co2$ in the vehicle cabin has risen in a manner which may indicate a living organism was left in the vehicle, or that some other thing which emits $Co2$, such as fire, is within the vehicle cabin. In such an illustrative variation, hardware onboard the vehicle may be used to communicate to the driver of the vehicle that there may be an unwanted occurrence or condition in the vehicle. Such determinations may be made in comparison to climate and occurrences exterior to the cabin of the vehicle.

In a number of illustrative variations, a GPS device may be used to determine that the GPS device is at a preselected location where alerts are to be suppressed, and a controller in communication with the GPS device may ensure that an alert is suppressed, in accordance with a preselected degree of suppression, where an alert would normally be produced.

In a number of illustrative variations, sometime after it is determined by the alert algorithm that an alert should be sent to a user of the alert system, a prompt may be sent to the user along with the alert, such as but not limited to specific issue oriented prompts such as "Unlock Doors?", "Open Windows?", and prompts which might be generally be applied across all issues such as "Call authorities?", or "Call in-vehicle security administrator?", and other prompts which might allow the alert system user to remotely change some circumstance surrounding the cause of the alert. In such illustrative variations, responding to the prompt and affecting a remote change in circumstance may require the use of a password, voice recognition, biometric recognition, or some other means of identity verification known in the art.

In a number of illustrative variations, the sequence or combination of events leading to an alert may be set by the manufacturer or a user of the alert system.

Referring to the illustrative variation shown in FIG. 1, a camera or sensor 101, aboard a vehicle 102, may sense a condition or occurrence 103, such as the movement of a child which was left in a car seat. Controller 104 may then receive a signal from the camera or sensor 101, or poll the camera or sensor 101, and determine that the occurrence is worthy of alerting an alert system user 105. Controller 104 may then deliver an alert 106 to alert system user 105. Alert system user 105 may receive the alert 106 in the form of a text, image, or data message on a mobile device 107. Controller 104 may additionally notify alert system user 105 that a condition or occurrence 103 worthy of an alert has taken place by causing vehicle 102 to emit a sound via a speaker, or via the vehicle horn 108.

Figure 2:
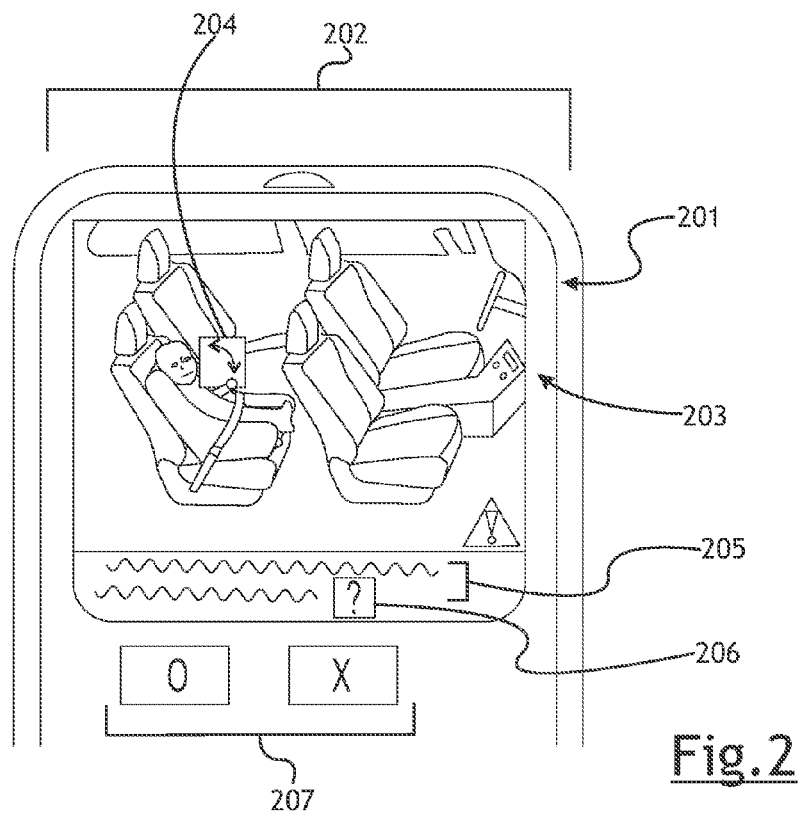
FIG. 2 illustrates a variation of the alert system by showing an example of an alert and prompt pairing, which may be sent to or received by an alert system user.

Referring to the illustrative variation shown in FIG. 2, an alert 201 may be received on a mobile device 202. The alert 201 may be in the form of a text message, accompanied by a picture 203, video recording, or other representation of the area in which a condition or occurrence 204 which caused the alert took place. The alert 201 may also be accompanied by text 205 which may contain a prompt 206, to which an alert system user may respond to by making a selection from any number of available or presented options 207 or by writing back to the sending address. The prompt 206 may be designed to allow the responder to affect the condition or occurrence 204 which caused the alert by responding to the prompt 206.

In a number of illustrative variations, sequential steps may be tracked by software using flags, interrupts, exception handling, signal handling or any other method known in the art or any combination of the aforementioned. For example, a controller may determine from memory or a signal that the vehicle engine has been stopped. The controller may denote this by responding to at least one of a signal or reading from the first sensor by asserting a "DISEMBARK" flag variable in memory. A first sensor may then detect that the vehicle driver has left the driver's seat. The controller may denote this combination by responding to at least one of a signal or reading from the first sensor by asserting a "EXITED" flag variable in memory. A second sensor may sense that something is sitting in one of the seats of the car which is not the driver's seat, or that the belt in one of those seats is locked into place, as if it is in use, and the controller may denote this by responding to at least one of a signal or reading from the second sensor by asserting a "CCONDITION" flag variable in memory. A memory reading device, which may perform a cyclic read on all flag variables in memory, may, in light of this combination of flag variable assertions, signal the controller to assert a "CLIMATEWATCH" flag variable in memory. Upon reading the "CLIMATEWATCH" flag, the memory reading device may signal the controller to poll at least one of the sensors for heat, humidity, and Co2 readings, interior and exterior to the vehicle cabin, and store the readings in memory. The controller may be told to do this on a periodic basis by the memory reading device, and to compare old readings to new readings in order to determine whether an alert should be raised based upon a sensed climate change. If the controller determines that an alert should be raised, it may assert a "CLIMATEALERT" flag in memory. The memory reading device, in the course of its cyclical read of flag variables, may then see that the "CLIMATEALERT" flag variable is asserted, and send a signal to the controller which may handle the signal by producing an alert to an alert system user after any amount of delay time. In some such illustrative variations, the alert may contain text indicating the issue, such as "Co2 levels in this vehicle have risen unnaturally since the driver left the vehicle. This could indicate that a living, breathing, organism was left in the vehicle." In some such variations, the alert may contain a prompt which allows the user to deal with the specific issue remotely, such as "Crack windows?" or "Turn on flow-through A/C?" Some alerts may be packaged with an image or video of the interior of the vehicle which might allow the alert system user to determine if there is a legitimate cause for concern in the vehicle, and may give the alert system user the opportunity to disregard the alert based upon their own assessment of the image.

In a number of illustrative variations, combinations of events may be tracked by software using flags, interrupts, exception handling, signal handling or any other method known in the art or any combination of the aforementioned. For example, a controller may determine from memory or a signal that the vehicle engine has been stopped. The controller may denote this by responding to at least one of a signal or reading from the first sensor by asserting a "DISEMBARK" flag variable in memory. A first sensor may then detect that no alert system users are in or near the vehicle. The controller may denote this combination by responding to at least one of a signal or reading from the first sensor by asserting a "EXITED" flag variable in memory. A second sensor may detect a sound being produced from within the vehicle interior. A microphone may be used to record the sound, series of sounds, or pattern of sounds, and the controller may be used to analyze the sound or sounds. If it is determined from analysis of the sound(s) by the controller that the sounds or series of sounds fall within a predetermined range of frequencies or patterns, such as but not limited to the frequencies or patterns of a human child or a distressed animal, the controller may assert a "SCONDITION" flag variable in memory. A memory reading device, which may perform a cyclic read on all flag variables in memory, may, in light of this combination of flag variable assertions, signal the controller to assert a "SOUNDWATCH" flag variable in memory. Upon reading the "SOUNDWATCH" flag, the memory reading device may signal the controller to convey an alert to at least one alert system user. In some such illustrative variations, the alert may contain text indicating the issue, such as "Sounds similar to that of a distressed animal have been detected in this vehicle." In some such variations, the alert may contain a prompt which allows the user to deal with the specific issue remotely, such as "Open voice channel to speak?" The alert may also contain a prompt which allows an alert system user to handle the issue in a manner which is not specific to the particular issue remotely, such as "Call authorities?" In some illustrative variations, such alerts may be packaged with an image or video of the interior of the vehicle, or a sound recording (for example, a sound recording of the sound which caused the alert), which might allow the alert system user to determine if there is a legitimate cause for concern in the vehicle, and may give the alert system user the opportunity to disregard the alert based upon their own assessment of the image, video, or sound.

In a number of illustrative variations, a notification or alert may be suppressed or cancelled by some action which is intended solely to suppress the notification or alert, or by an action which breaks the sequence which caused the notification or alert.

In a number of illustrative variations, an alert may be produced by any number of sensory means including but not limited to an audio notification by a device such as a speaker; a visual notification by a device such as a display screen or an indicator light, including text messages or emails; or, a physical notification such as a physical pop-out indicator or a vibrating component which may come into contact with the user. Means for producing such an alert may be located on the interior of a vehicle as well as on the exterior of a vehicle.

In a number of illustrative variations, an alert may be produced by a first source, located outside of a vehicle cabin, and further conveyed through a secondary source which may be a mobile device carried by an alarm system user. For example, a beep may be produced by a speaker under the hood of the car and a reminder may also be received as a picture or text message by an alarm system user. Further, the secondary source may require some additional step to occur before it will produce an alert. For example, the user may need to close a particular door on the car before a text or picture message will be sent when an alert is produced. This additional step may be tracked by the controller.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: providing a vehicle; providing a number of sensors or cameras; providing a data storage medium, capable of storing data in a format readable by an electronic device; using at least one of the sensors or cameras and a controller to determine that:
 a) at least one alert system user has exited the vehicle;
 b) an occurrence on the interior of the vehicle is worthy of alerting alert system users;
and, using the controller to determine that (a) and (b) have occurred and to alert at least one alert system user of the occurrence.

Variation 2 may include the method of variation 1 wherein the using at least one of the sensors or cameras and a controller to determine that an occurrence on the interior of the vehicle is worthy of alerting alert system users comprises: using at least one of the sensor or cameras to take at least one reading of the climate interior to the vehicle cabin; using the controller to store the a first reading in the data storage medium; using at least one of the sensors or cameras to take a second reading of the climate interior to the vehicle cabin; using the controller to compare the first reading to the second reading of the climate interior to the vehicle cabin; and, raising an alert based upon the result of controller logic regarding the first and second readings of the climate interior to the vehicle cabin.

Variation 3 may include the method of variation 2 wherein the using at least one of the sensors or cameras and a controller to determine that an occurrence on the interior of the vehicle is worthy of alerting alert system users further comprises: using at least one sensor or camera to take first and second readings of the climate exterior to the vehicle cabin; and, using the controller to associate the first and second readings of the climate exterior to the vehicle cabin with the first and second readings of the climate interior to the vehicle cabin.

Variation 4 may include the method of variation 1 wherein the using at least one of the sensors or cameras and a controller to determine that an occurrence on the interior of the vehicle is worthy of alerting alert system users further comprises: first using at least one of the sensors or cameras to detect that at least one alert system user has left the vehicle.

Variation 5 may include the method of variation 1 wherein the using at least one of the sensors or cameras and a controller to determine that an occurrence on the interior of the vehicle is worthy of alerting alert system users comprises: using at least one sensor or camera to determine that a certain type of sound is being produced within the interior of the vehicle cabin.

Variation 6 may include the method of variation 5 wherein the certain type of sound is defined by the range of sound frequencies or patterns which fall into a range which is common for sounds made by children.

Variation 7 may include the method of variation 1 wherein the using at least one of the sensors or cameras and a controller to determine that an occurrence on the interior of the vehicle is worthy of alerting alert system users comprises: using at least one sensor or camera to determine that there is movement within the vehicle cabin.

Variation 8 may include the method of variation 1 wherein the using at least one of the sensors or cameras and a controller to determine that an occurrence on the interior of the vehicle is worthy of alerting alert system users comprises: using at least one sensor or camera to determine that there is heat being generated by something in the vehicle cabin.

Variation 9 may include the method of variation 1 wherein the using at least one of the sensors or cameras and a controller to determine that an occurrence on the interior of the vehicle is worthy of alerting alert system users comprises: using at least one sensor or camera to determine that gas concentrations within the vehicle cabin have changed.

Variation 10 may include the method of variation 1 wherein the alerting at least one alert system user comprises: producing a sound.

Variation 11 may include the method of variation 10 wherein the alerting at least one alert system user by producing a sound comprises: sending the alert system user an audio recording of the sound or pattern of sounds which caused the alert.

Variation 12 may include the method of variation 1 wherein the alerting at least one alert system user comprises: notifying an alert system user by visual means.

Variation 13 may include the method of variation 12 wherein the alerting an alert system user by visual means comprises: sending the alert system user a photo or video of the interior of the vehicle.

Variation 14 may include the method of variation 1 wherein the alerting at least one alert system user comprises: prompting the user to make a decision based upon the occurrence which caused the alert.

Variation 15 may include the method of variation 1 wherein the alert is raised after a predetermined time delay.

The above description of select variations within the scope of the invention is merely illustrative in nature and, thus, variations or variants thereof are not to be regarded as a departure from the spirit and scope of the invention.

What is claimed is:

1. A method comprising:
   providing a vehicle;
   providing a number of sensors or cameras;
   providing a data storage medium, capable of storing data in a format readable by an electronic device;
   using at least one of the sensors or cameras and a controller to determine that:
   a. at least one alert system user has exited the vehicle;
   b. an occurrence on the interior of the vehicle is worthy of alerting alert system users; and,
   using the controller to determine that (a) and (b) have occurred and to alert at least one alert system user of the occur;
   wherein the using at least one of the sensors or cameras and a controller to determine that an occurrence on the interior of the vehicle is worthy of alerting alert system users comprises:
   using at least one of the sensor or cameras to take at least one reading of the climate interior to the vehicle cabin;
   using the controller to store the a first reading in the data storage medium;
   using at least one of the sensors or cameras to take a second reading;
   using the controller to compare the first reading to the second reading of the climate interior to the vehicle cabin; and,
   wherein the using at least one of the sensors or cameras and a controller to determine that an occurrence on the interior of the vehicle is worthy of alerting alert system users further comprises:
   using at least one sensor or camera to take first and second readings of the climate exterior to the vehicle cabin; and,
   using the controller to associate the first and second readings of the climate exterior to the vehicle cabin with the first and second readings of the climate interior to the vehicle cabin.

2. The method of claim 1 wherein the using at least one of the sensors or cameras and a controller to determine that an occurrence on the interior of the vehicle is worthy of alerting alert system users comprises:
   using at least one sensor or camera to determine that a certain type of sound is being produced within the interior of the vehicle cabin.

3. The method of claim 2 wherein the certain type of sound is defined by the range of sound frequencies or patterns which fall into a range which is common for sounds made by children.

4. The method of claim 1 wherein the using at least one of the sensors or cameras and a controller to determine that an occurrence on the interior of the vehicle is worthy of alerting alert system users comprises:
   using at least one sensor or camera to determine that there is movement within the vehicle cabin.

5. The method of claim 1 wherein the using at least one of the sensors or cameras and a controller to determine that an occurrence on the interior of the vehicle is worthy of alerting alert system users comprises:
   using at least one sensor or camera to determine that there is heat being generated by something in the vehicle cabin.

6. The method of claim 1 wherein the using at least one of the sensors or cameras and a controller to determine that an occurrence on the interior of the vehicle is worthy of alerting alert system users comprises:
   using at least one sensor or camera to determine that gas concentrations within the vehicle cabin have changed.

7. The method of claim 1 wherein the alerting at least one alert system user comprises: producing a sound.

8. The method of claim 7 wherein the alerting at least one alert system user by producing a sound comprises:
   sending the alert system user an audio recording of the sound or pattern of sounds which caused the alert.

9. The method of claim 1 wherein the alerting at least one alert system user comprises:
   notifying an alert system user by visual means.

10. The method of claim 9 wherein the alerting an alert system user by visual means comprises:
    sending the alert system user a photo or video of the interior of the vehicle.

11. The method of claim 1 wherein the alerting at least one alert system user comprises:
    prompting the user to make a decision based upon the occurrence which caused the alert.

12. The method of claim 1 wherein the alert is raised after a predetermined time delay.

13. The method of claim 1 wherein the portable communication device is embedded in FOBs, phone, personal effects, jewelry, or clothing.

* * * * *